July 23, 1968   J. H. CREIGHTON   3,393,454
COMPASS
Filed June 30, 1967

*INVENTOR.*
JOHN H. CREIGHTON
BY *William A. Murray*
ATTORNEY 3,393,454
COMPASS
John H. Creighton, 1728 9th Ave.,
Moline, Ill. 61265
Filed June 30, 1967, Ser. No. 650,460
11 Claims. (Cl. 33—27)

ABSTRACT OF THE DISCLOSURE

A compass type implement comprising a metallic tape having indicia indicating lengthwise demensions and permanently stressed to repose in a coil, and having a concave-convex cross section when out of repose with the convex side of the tape facing the center of the coil; a scribing element fixed to the end of the tape; and a centering device adjustable lengthwise of the tape and supported thereon, with the centering device and scribing element being supported on the tape by means retaining the tape in a concave-convex cross section.

Background of the invention (1) Field of the invention: This invention relates to a compass type implement and more particularly to a compass utilizing a steel tape as a compass arm that is prestressed into a coil while in repose and having a concave-convex cross section when out of repose with the convex side facing the center of the coil.

(2) Description of the prior art: It has heretofore been known to provide a scribing and centering device at spaced locations on a steel tape so that a circle could be struck. Such is shown to be old in U.S. Patents 1,045,300, 2,298,585, 2,582,488, 2,621,409 and 2,804,688. However, in the prior patents the tape is always flexible and requires both hands to operate, one hand being placed on the centering device and the other on the scriber, to strike an arch. Both hands are required to maintain the tape taut so that the circle or arch may be struck.

Summary

With the above in mind it is the primary object of this invention to mount a scribing device and centering device on a steel tape of a special construction so that sufficient stiffness is retained within the tape so that the arm of the compass, i.e., the part of the compass between the scribing and centering devices, has sufficient rigidity that an arch may be struck.

Specifically it is proposed to mount a scribing and centering device on a tape stressed to repose in a coil and further characterized by having a concave-convex cross section when it is drawn out of repose, with the convex side facing the center of the coil.

A conventional steel tape is normally designed to have a concave convex cross section when it is in a wound condition, but to be stressed into a concave-convex cross section as it is unwound. In the latter condition the concave side of the tape faces the center of the coil.

It has been found that in a tape prestressed to coil, the forces within the prestressed tape causing the tape to coil may be overcome if the extended portion of the tape has a concave-convex cross section opposite to the natural concave-convex cross section, i.e., a concave-convex cross section in which the convex side faces the center of the coil. Thus, the tape may be designed somewhat in a state of equilibrium or balance in which the coiled portion of the tape tends to remain coiled and the extended portion tends to retain itself in an extended condition. Such a tape is described in detail in U.S. Patent 2,956,795 and it is suggested that reference be made to the patent for a better understanding of the exact characteristics of the tape.

With the above type of tape it is proposed to mount centering and scribing devices on the tape designed to retain the extended portion of the tape in its concave-convex cross section. The scribing device is on the end of the tape and the centering device includes a clamp adjustable lengthwise along the tape. Thus, the tape is divided into a coiled portion that bears against the centering device and an extended portion that extends between the centering and scribing devices, the latter portion serving as the compass arm.

Description of the preferred embodiment

Figure 1:
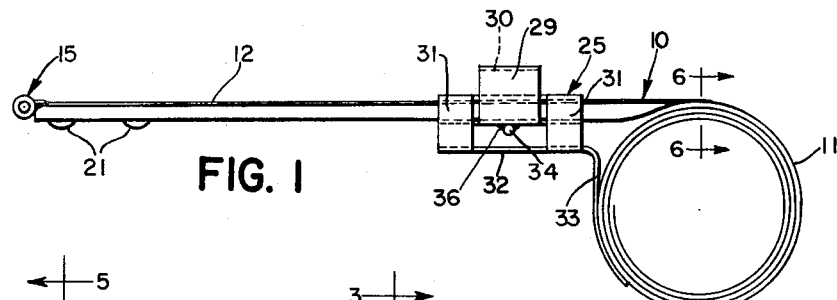
FIG. 1 is a top view of the compass type implement.
Figure 2:
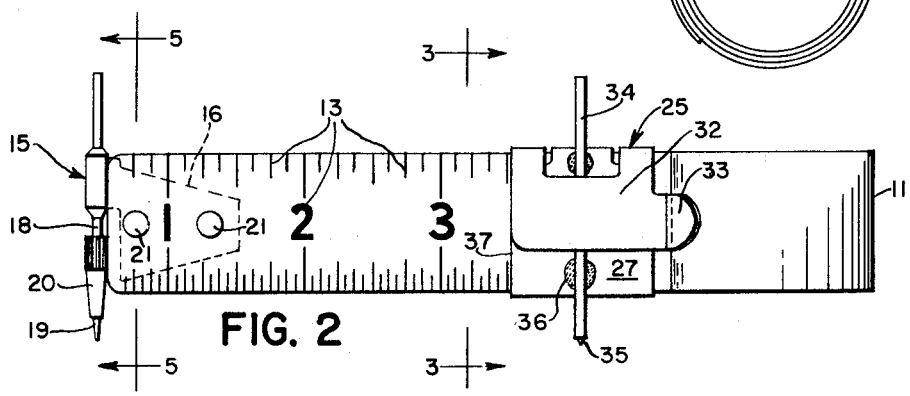
FIG. 2 is a side view of the compass type implement.
Figure 3:
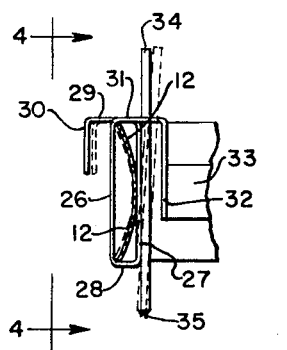
FIG. 3 is a sectional view taken along line 3—3 of FIG. 2.
Figure 4:
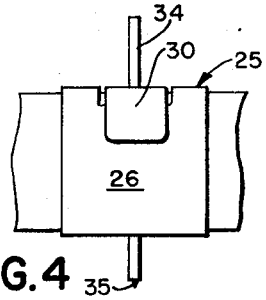
FIG. 4 is a side view of one portion of the compass as viewed along line 4—4 of FIG. 3.
Figure 6:
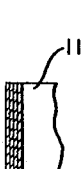
FIG. 6 is a sectional view taken along line 6—6 of FIG. 1.
Figure 5:
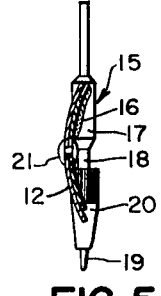
FIG. 5 is a sectional view taken along the line 5—5 of FIG. 2.

The compass is composed of a tape 10 having a coiled end or portion 11 and an extended end or portion 12. The tape is of metallic material and is prestressed to repose entirely in a coil, as shown at 11. The tape has a concave-convex cross section when out of repose or extended, as is shown in FIGS. 3 and 5, with the convex side of the tape facing the center of coil 11. Indicia 13 is provided on the convex side and indicates the length of the extended portion 12.

A scribing device 15 is fixed to one end of the tape 10 and is composed of a bracket 16 welded to a lead holding member 17. The member 17 is composed in part of a vertical stem section 18 split at its lower end to receive the upper end of a piece of lead 19. A lock nut 20 fits over the split lower end, not shown, and locks the lead in the desired position. The bracket 16 is of convex-concave cross section with a surface thereof laying against the surface of the end of the tape 10 and fixed thereto by pins 21. The bracket 16 prevents the extreme end of the portion 12 from winding or coiling and also retains the end in an arcuate or convex-concave shape.

Figure 7:
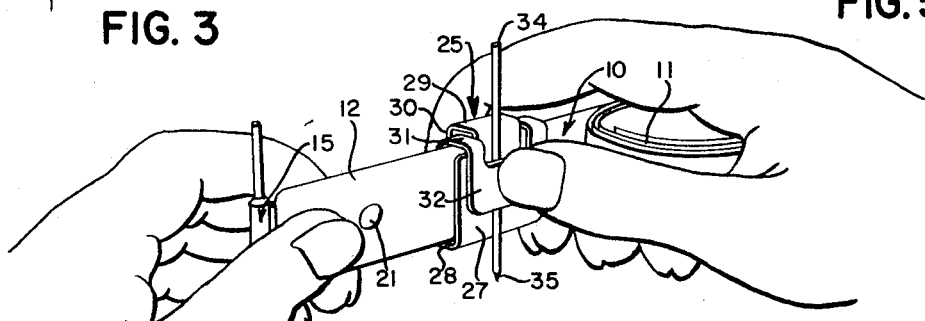
FIG. 7 is a perspective view of the compass as it is being extended.

A centering pin device 25 is slidably carried on the tape 10 and includes a unitary structure or clamp composed of vertical members 26, 27 joined by an integral end 28 along the lower edge of tape 10. The member 27 has an upper portion 29 extending first over the upper edge and then downwardly to a vertical main section 30 spaced from the member 26. The member 26 has an upper portion 31 extending first over the upper edge of the tape and then downwardly to main vertical portion 32 offset from the member 27. As may best be seen from viewing FIG. 3, the portion 28 and the parts 29, 30 extending over the upper edge of the tape 10 bears against the upper and lower edges of the tape and holds the tape in a concave-convex shape. The portions 26, 27 retain the adjacent portion of the tape from winding or coiling. Also, the entire device is of spring steel so that the portions 26, 27 clamp against the tape. As may clearly be seen from viewing FIG. 7, the fingers of a draftsman may engage and compress the portions 30, 32 so that the clamping action is relieved. The centering device may then be adjusted lengthwise along the tape.

An arm 33 extends from the vertical portion 32 to engage the outer convolution of the coil portion 11 of the spring. Consequently, the device 25 separates the coiled portion 11 from the extended portion 12 and is at the juncture between the portions 11, 12. A centering pin 34 having a lower point 35 is welded at 36 to the face of the vertical portion 27. The numbers of indicia 13 are offset from the scriber 15 so that the edge 37 of plate portion 27 will accurately give the distance between the point 35 and scriber lead 19.

In operation the bracket 16 of the scriber and the clamping members 26, 27 will tend to retain the extended portion 12 against coiling. Being concave-convex in cross section, the extended portion 12 will retain a degree of rigidity and consequently an accurate arch may be struck between point 35 and point 19. The tape as it is played through the centering device will coil due to the prestressing of the tape.

I claim:

1. A compass type implement comprising the combination of a metallic tape permanently stressed to coil when in repose and having a concave-convex cross section when out of repose with the convex side of the tape facing the center of the coil, and when out of repose to be relatively stiff lengthwise; a scribing element fixed to one end of the tape and projecting from one edge thereof; and a centering pin device slidably supported on the tape for movement longitudinal thereof between a coiled portion and extended portion and having a centering pin projecting from the aforesaid edge of the tape, the device further having an abutment engageable with the coiled portion.

2. The structure as set forth in claim 1 in which the scribing element is fixed to the end of the tape by a rigid bracket support extending lengthwise of and fixed to an end portion of the tape and preventing that end portion from coiling.

3. The structure as set forth in claim 2 in which the bracket support has a curvature equivalent to the concave-convex cross section and the bracket support is fixed to the tape whereby said end portion of the tape is held in its concave-convex disposition.

4. The structure as set forth in claim 1 whereby the centering pin device includes parts engaging opposite edges of the tape when the latter is in its concave-convex disposition to thereby restrict the tape against flattening from its concave-convex disposition.

5. The structure as set forth in claim 1 whereby the centering pin device includes a clamp that extends lengthwise of and bears against a surface of a portion of the tape to thereby prevent the latter portion from coiling.

6. The structure as set forth in claim 1 further characterized by the abutment on the pin device being an arm projecting outwardly in respect to a face of the tape and adapted to engage the outer convolutions of the coiled portion of the tape.

7. The structure as set forth in claim 1 in which the entering pin device is composed of elements holding the tape in a concave-convex disposition whereby the expanse of tape extending between the scribing element and pin device tends to be retained in a concave-convex disposition and out of the coiled repose.

8. The structure as set forth in claim 1 in which the pin centering device is composed of a pair of members on opposite sides of the tape that are spring loaded to engage the tape and said device is adapted to retain the portion of the tape between the members in an extended disposition.

9. The structure as set forth in claim 8 in which the members are integrally joined by an integral section along one edge of the tape and each member has an integral portion extending first around the other edge and then terminates in a section spaced from the opposite side of the tape and substantially parallel thereto, the latter sections being adapted to receive fingers for manually overcoming the spring load of the members against the tape.

10. The structure as set forth in claim 1 in which one of the surfaces of the tape is indicia bearing to indicate distances between the scribing element and the centering pin device and the centering pin device includes an edge extending across the surface of the tape that indicates the precise distance between the scribing element and centering pin.

11. A compass structure comprising: a tape composed of adjoining coiled and extended portions, the tape being prestressed to coil throughout substantially its entire length, and with the extended portion having a concave-convex cross section with the convex side facing the center of the coil, and the coiled portion of the tape being straight in cross section; a clamp at the juncture between the coiled portion and the extended portion adapted for adjustment lengthwise along the tape whereby the extended portion may be extended from and recoiled on the coiled portion, the clamp having an abutment thereon engaging the coiled portion; a centering pin fixed to the clamp and depending therefrom; and a marking unit fixed to the free end of the extended portion depending from an edge of the tape.

References Cited
UNITED STATES PATENTS

| | | |
|---|---|---|
| 1,988,095 | 1/1935 | Stockman. |
| 2,542,561 | 2/1951 | Olejniczak. |
| 2,608,766 | 9/1952 | Thein _____ 33—158 |
| 2,621,409 | 12/1952 | Dvorak. |
| 2,698,484 | 1/1955 | Zern et al. _____ 33—160 X |
| 2,956,795 | 10/1960 | Foster _____ 33—138 X |
| 3,035,352 | 5/1962 | Pope. |
| 3,293,754 | 12/1966 | Lenzini et al. |

HARRY N. HAROIAN, *Primary Examiner.*